Oct. 29, 1935.  G. A. BERRY  2,019,245
METHOD OF COOLING HOT GASES CONTAINING OXIDES OF SULPHUR
Filed May 29, 1931
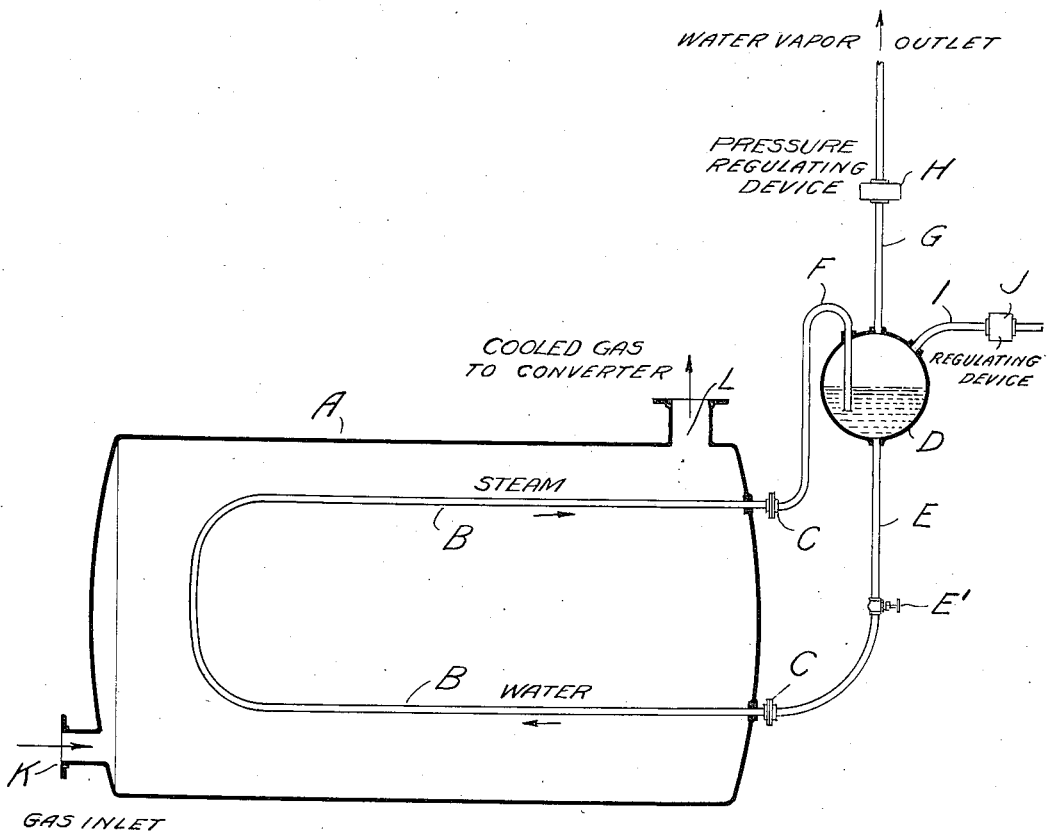
Inventor
GEORGE A. BERRY,
By H. C. B--
Attorney Patented Oct. 29, 1935

2,019,245

UNITED STATES PATENT OFFICE 2,019,245

METHOD OF COOLING HOT GASES CONTAINING OXIDES OF SULPHUR

George A. Berry, Bound Brook, N. J., assignor to Calco Chemical Company, Inc., Bound Brook, N. J., a corporation of Delaware Application May 29, 1931, Serial No. 540,822

2 Claims. (Cl. 23—1)

This invention relates to a method of controlling the temperature of gases containing oxides of sulphur and more particularly, to gases suitable for use in the manufacture of sulphuric acid or other direct derivatives of the oxides of sulphur.

The usual method for producing gases containing sulphur oxides is to burn brimstone or sulphur ores with air. This reaction is strongly exothermic and the gases leave the burners at a high temperature. This temperature may vary from around 900° F. with ore gases to around 1800° with brimstone gases. It is generally necessary to reduce or remove this heat before they can be used for any of the purposes to which they are adapted.

The chief difficulty in cooling gases containing oxides of sulphur lies in the corrosive action of the gases themselves or their derivatives upon the equipment used. This is due to the fact that as the temperature of the gases is reduced, acid is condensed which attacks the equipment.

In cooling gases containing oxides of sulphur, it frequently happens that the cooling surfaces in contact with the gases, is below the point at which sulphuric acid, for example, will condense, and as a result, this acid does condense and corrodes the metal surfaces of the coolers. For example, the gases may be passed through a flue immersed in water, under such conditions that the average temperature of the gas leaving the cooler is well above the boiling point of 580° F., and yet sulphuric acid will condense on the inner surface of the pipe due to its being maintained at too low a temperature.

One of the methods used for cooling gases containing sulphur oxides is to cool the gases in iron flues to about 650° F., and then to add water to the gases, if not already present in sufficient amounts, to form sulphuric acid with the sulphur trioxide present and to greatly reduce the strength of the acid condensed. This weak acid would rapidly corrode iron, but has only a slight effect upon lead. For these reasons, the cooling of the gases from 650° F. down, has generally been accomplished in lead equipment.

One of the chief objects of this invention is a method for the cooling of gases containing oxides of sulphur in iron equipment to a point considerably below 650° F.

I have found that the point at which sulphuric acid condenses depends primarily upon three factors, namely, the temperature of the gas, the moisture content of the gas and the amount of sulphur trioxide present. With these factors in mind, I call the temperature at which sulphuric acid actually condenses under the conditions of the operation, "dew point".

I have found that where a large amount of moisture is present, other things being equal, the gas will have a relatively high dew point. Likewise if the moisture and temperature remain constant, and the sulphur trioxide content is increased, the dew point will be raised. It will, therefore, be seen that there is a direct relation between temperature and the moisture and sulphur trioxide content of the gases.

I have further found that if the moisture content of the gases is carefully controlled, and for example, maintained below about 2 milligrams per cubic foot, the dew point of the gases is materially below 580° F., and with well dried gases may be as low as 350° to 400° F. One of the features of my process, therefore, is to carefully regulate the moisture content of the gases by drying the air used for producing these gases.

I have found that when the heat is removed from the gases by a cooling medium, such as air or water, in a tube operating in heat exchange relation with the hot gases, the temperature of the surface of this tube in contact with the sulphur containing gases is of first importance in preventing corrosion to the tube. My method of cooling these gases depends upon maintaining this surface of the tube above the dew point of the gases. If the temperature of the cooling medium is too low, too much heat will be abstracted through the wall of the tube and the surface in contact with the gases will deposit acid dew and corrosive destruction of the equipment will take place. On the other hand, if the cooling medium is at too high a temperature, insufficient removal of heat will take place and it will be impossible to cool the gases to as low a point as desired in some operations.

In a development of the contact sulphuric acid process in which brimstone is used for producing the oxide gases, the air entering the system is commercially dried before it enters the burner. The gases are then reduced to an average temperature approximately 750° F. However, in cooling these gases to this average temperature, the gases in contact with the cooling surface may under certain local conditions be much below this temperature and may in fact be well below the dew point, resulting in condensation of acid and corrosion of the cooling equipment. This is especially true if cold water, for example, is used as the cooling medium in thin walled cooling apparatus.

In a still more recent development of the contact sulphuric acid process, in which the well known Selden automatic heat exchange converters are used, the temperature resulting from the oxidation of $SO_2$ to $SO_3$ in the converter is controlled by passing cooler entering gases through heat interchange tubes embedded in the catalyst. By this method of operation, heat is abstracted from the catalyst bed in a regulated manner to give the optimum temperature conditions for catalytic reaction. The entering gases are thereby heated before being released in the catalyst to about 750° F., which is the temperature at which the catalytic reaction begins.

It will be seen from the above description that the amount of cooling to be done in the converter by the gases entering the heat exchange tubes, depends upon their relative coolness below 750° F. Generally speaking, the entering gases should be around 400° F., as they enter the cooling tubes of the converter but this temperature varies to a considerable extent, depending upon the strength of the burner gas used, radiation of heat from the equipment, the rate of operation of the plant, etc. It is, therefore, important not only to cool the gases to a relatively low temperature, but also to have a very accurate and regulatable control over the temperature of the gases.

My invention is directed first to a process for cooling sulphur oxides containing gases, and second, to a method of accurately regulating the temperature of these gases as they leave the cooling equipment. This I accomplish by varying and regulating the amount of heat removed from the gases contacting with the cooling equipment in such a manner that the temperature of the cooling surface in contact with the gases is never below the dew point.

Where it is desired to cool the gases to a low temperature, say 350° to 400° F., I prefer to dry the air entering the system to a point where it contains less than 2 milligrams of moisture per cubic foot. For higher temperatures a less complete drying of the air is required, and for temperature above, say 600° F., a considerable amount of moisture can be present without too greatly limiting the use of my process.

If the burner gases are passed directly over pipes through which water is circulated at atmospheric temperature, the walls of the pipe will be so cold that acid will condense on the surface and corrode and destroy them. In such cases, quick and rapid cooling of the gases can be obtained over a wide range but the problem of corrosion is not met. If the burner gases are passed over tubes through which air is circulated, the burner gases can also be cooled, but an expensive equipment is required and moreover the question of controlling temperature of gas is so complicated and difficult that local cooling below the dew point may take place and cause corrosion.

I have found that if the burner gases are passed in contact with a compact series of tubes containing a regulated amount of water, by regulating the pressure of the vapor obtained within the tubes, I can accurately control the temperature of the sulphur-bearing gases and prevent the condensation of sulphuric acid and hence its corrosive and destructive action.

I have illustrated in the drawing a diagrammatic showing of an apparatus for carrying out the above invention.

As illustrated, a suitable chamber is shown at A which may be of steel or cast iron or other suitable material of a gas-tight nature, into which is inserted one or more U-shaped pipes B, these pipes preferably having external joints as at C.

Above the chamber A is a supply tank D for water, which may flow through the pipe E to the lower bend of the U-pipe B contained within the chamber A. A valve E' or any other suitable device such as a diaphragm is provided in the supply pipe from the tank D, for regulating the flow of water from the latter to the pipe B. A return pipe F connects one leg of the pipe B to the tank D, preferably below the liquid level therein. A pipe G leads to any suitable point where the water, evaporated in the system, can be removed from the system. A pressure regulating valve is shown diagrammatically at H. Water for the tank D is supplied through the pipe I and may be regulated and controlled by means of the regulating device J.

Burner gases enter the chamber A through the inlet K and they are discharged through pipe L, which is connected to a converter of any suitable type. The chamber A may be provided with baffles to cause the maintenance of intimate contact between the burner gases and the pipe or tube B.

In operation, the burner gases enter the chamber A at K, these gases being normally at a temperature of approximately 1200° F. These hot gases first contact with the walls of the lower leg of tube B, where liquid water exists. There is a heat transfer at this point in the system, whereby the liquid water is converted into steam which rises to the upper leg of the U-tube. Further contact of the burner gases with the upper portion of the U-tube B causes this steam to be super-heated, with a further heat exchange, with the result that the burner gases may be made to leave the chamber through the exit port L at a temperature of 450° F.

The prevention of condensation of sulphuric acid in the chamber A depends upon the exact system of control which is maintained over the burner gases, as to temperature. This control is had by reason of the fact that the water in the chamber D is regulated and controlled, the regulation being obtained by means of the valve E' in the supply pipe. When liquid water is permitted to flow into the lower bend of the U-pipe, it first comes in contact with the burner gases at their highest temperature and is evaporated quickly into steam. The heat required for evaporating of the water quickly reduces the temperature of the gas and the steam passes along through the pipe B, where it is super-heated with still further heat transfer from the burner gas. It is to be noted that the hot burner gases first come in contact with the pipe B where water in the liquid stage is present and where it is evaporated, and that later these partially cooled gases come in contact with the pipe containing steam. It is important that the pipe in contact with the liquid water will be colder than the pipe in contact with the super-heated steam. By this means, it has been demonstrated that no sudden cooling takes place, but on the contrary, heat is abstracted from the gases at such rates that at no time is the temperature of the wall of the tube with which the gases contact, colder than the dew point of sulphuric acid for those gases.

Under certain conditions, it may be desirable to operate so that water is evaporated through the entire length of the U-pipe B. On the other hand, it may be desirable, under certain conditions, to operate with a very limited supply of water to the tube B, so that practically all of the tube area is producing super-heated steam. In any of the above events, it is important that the temperature is so regulated that the removal of heat from the burner gases either by evaporation of water in the tubes or by the super-heating of steam, or by both, takes place under such conditions that the temperature of the cooling surfaces in contact with the gases does not drop below the dew point of the gas mixture.

The steam saturated or super-heated is discharged from the tube B and returned to the tank D. Water evaporated in the system is vented through the regulating device H and may be condensed or otherwise disposed of, as desired. I have found that when using saturated steam, by varying the pressure in the system and controlling it by the regulating device H, I can obtain a nicety of control over the temperature of the gas leaving the system at L. For example, if I do not wish to control the temperature of the burner gas entirely by the valve E', I may partially control the temperature by varying the pressure through the regulating device H, such as lowering the pressure in the system and maintaining the supply of water in the tube B constant. This consequently increases the speed at which the water is evaporated in the tube. If, with a high pressure, it requires the entire length of the lower section of tube B to evaporate the water, then by reducing the pressure, I am able to evaporate all of the water in a portion only of tube B. It will thus be seen that there is a direct relation between control by means of device H and the system of controlling the cooling of the gas in the chamber either by the evaporation of water or super-heating the steam.

It may be desirable to cause a heat transfer and cooling of the gases to take place while the gases are under pressure in the chamber A. Due to the greater density of the gases under these conditions, a better transference of heat may be obtained.

I claim:

1. A method of cooling hot gases containing oxides of sulphur to temperatures suitable for the production of sulphuric acid therefrom by the contact process which comprises passing said hot gases in heat exchange relation with liquid water maintained under a constant pressure such that its boiling point is below the temperature of said gases but above the dew point of the gases, whereby heat is absorbed at constant temperature by the water and steam is evolved, and then passing said gases in heat exchange relation with the steam so generated whereby the steam is superheated and the temperature of the gases is lowered to the desired degree.

2. A method of cooling hot gases containing oxides of sulphur to temperatures suitable for the production of sulphuric acid therefrom by the contact process which comprises passing said gases in heat exchange relation with liquid water maintained under a constant pressure such that its temperature is below the temperature of said gases but above the dew point of the gases, whereby steam is generated at constant temperature, passing said gases in heat exchange relation with the steam so generated whereby they are further cooled and the steam is superheated, and passing the superheated steam in direct heat exchange relation with cooler make-up water which is present in a closed receptacle whereby constant pressure is maintained in the system.

GEORGE A. BERRY.